US006189416B1

(12) United States Patent
Groom

(10) Patent No.: US 6,189,416 B1
(45) Date of Patent: Feb. 20, 2001

(54) STUD BOLT TOOL AND METHOD OF USING SAME

(76) Inventor: Raymond D. Groom, 6900 Oak Leaf Dr., Space 24, Orange, TX (US) 77630

( * ) Notice: Under 35 U.S.C. 154(b), the term of this patent shall be extended for 0 days.

(21) Appl. No.: 07/944,500

(22) Filed: Sep. 14, 1992

(51) Int. Cl.$^7$ ................................................ B25B 13/50
(52) U.S. Cl. .......................................... 81/53.2; 411/321
(58) Field of Search ........................... 81/53.2, DIG. 11; 411/321

(56) References Cited

U.S. PATENT DOCUMENTS

| | | | |
|---|---|---|---|
| 692,988 | * | 2/1902 | Davis ..................................... 81/53.2 |
| 751,345 | * | 2/1904 | Saunders ............................... 81/53.2 |
| 846,593 | | 3/1907 | Minne . |
| 1,134,596 | * | 4/1915 | Dillon .................................. 411/321 |
| 1,183,556 | | 5/1916 | Green . |
| 1,317,332 | * | 9/1919 | Stark .................................... 411/321 |
| 1,740,377 | * | 12/1929 | Snyder et al. ......................... 81/53.2 |
| 2,795,159 | * | 6/1957 | Sine ..................................... 81/53.2 |
| 3,718,058 | | 2/1973 | Jones, Jr. . |
| 4,619,568 | | 10/1986 | Carstensen . |
| 4,620,460 | * | 11/1986 | Gonzales, Jr. .................. 81/DIG. 11 |
| 4,880,343 | | 11/1989 | Matsumoto . |
| 4,977,799 | | 12/1990 | Yasutomi et al. . |

FOREIGN PATENT DOCUMENTS

0835790 * 12/1938 (FR) ..................................... 411/292

* cited by examiner

Primary Examiner—James G. Smith
(74) Attorney, Agent, or Firm—Pravel, Hewitt, Kimball & Krieger, P.C.

(57) ABSTRACT

A stud bolt tool and method for using the stud bolt tool to install or remove a threaded stud bolt from a threaded blind bore. The stud bolt tool has a cylindrical housing having a first and second surface and an internally threaded bore communicating with the first and second surfaces. The housing includes a plurality of circumferentially spaced ports surrounding the internally threaded bore. The ports communicate with the first and second surfaces of the cylindrical housing and each port has a threaded portion extending to the second surface. A plurality of balls are slidably stacked in each port. The ball nearest the first surface is capable of partially protruding beyond the first surface and is also capable of retracting within the port below the first housing surface. A screw threadably engages each threaded portion of each port. Advancement of the screw into the port forces the ball to partially protrude beyond the first surface.

11 Claims, 2 Drawing Sheets

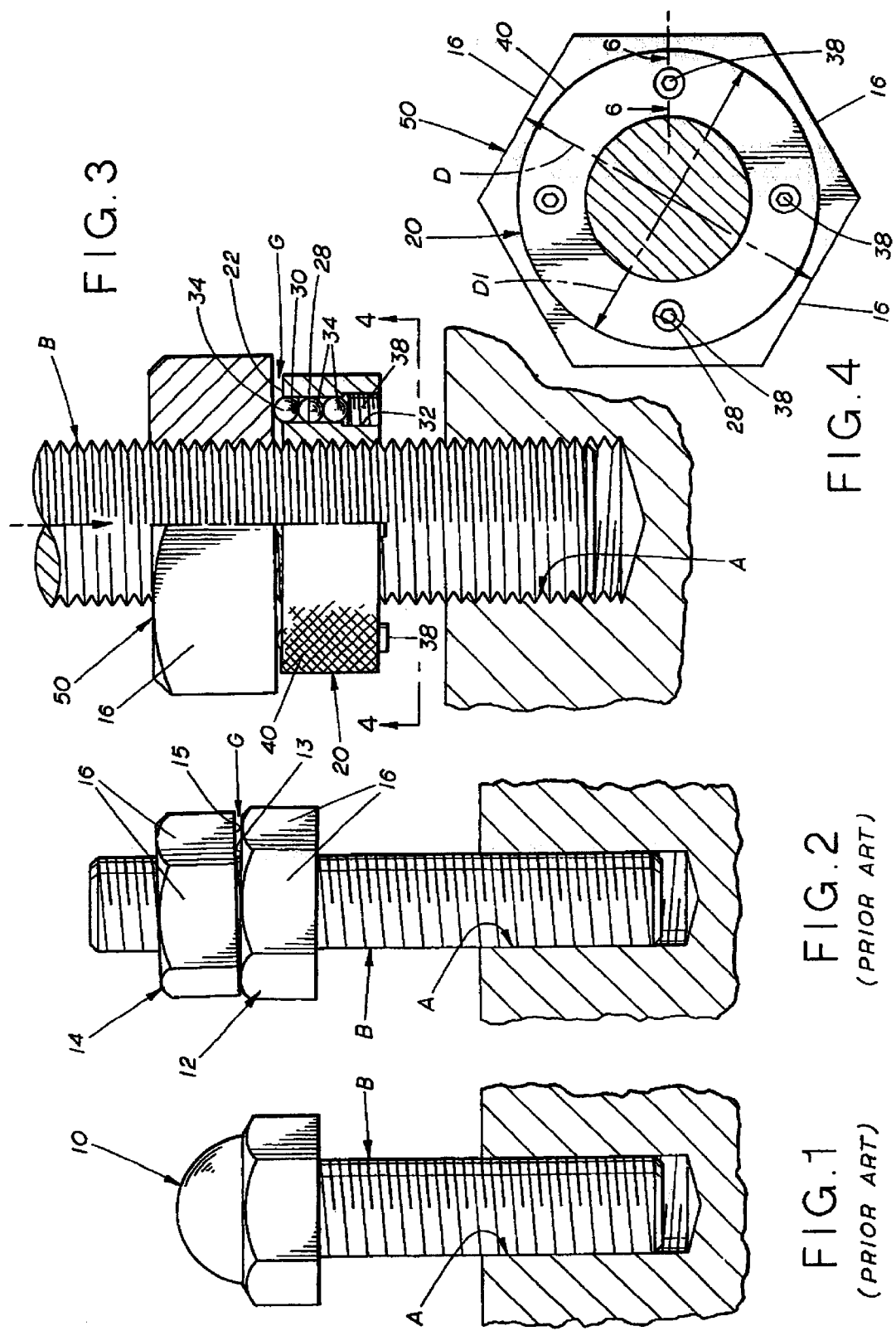

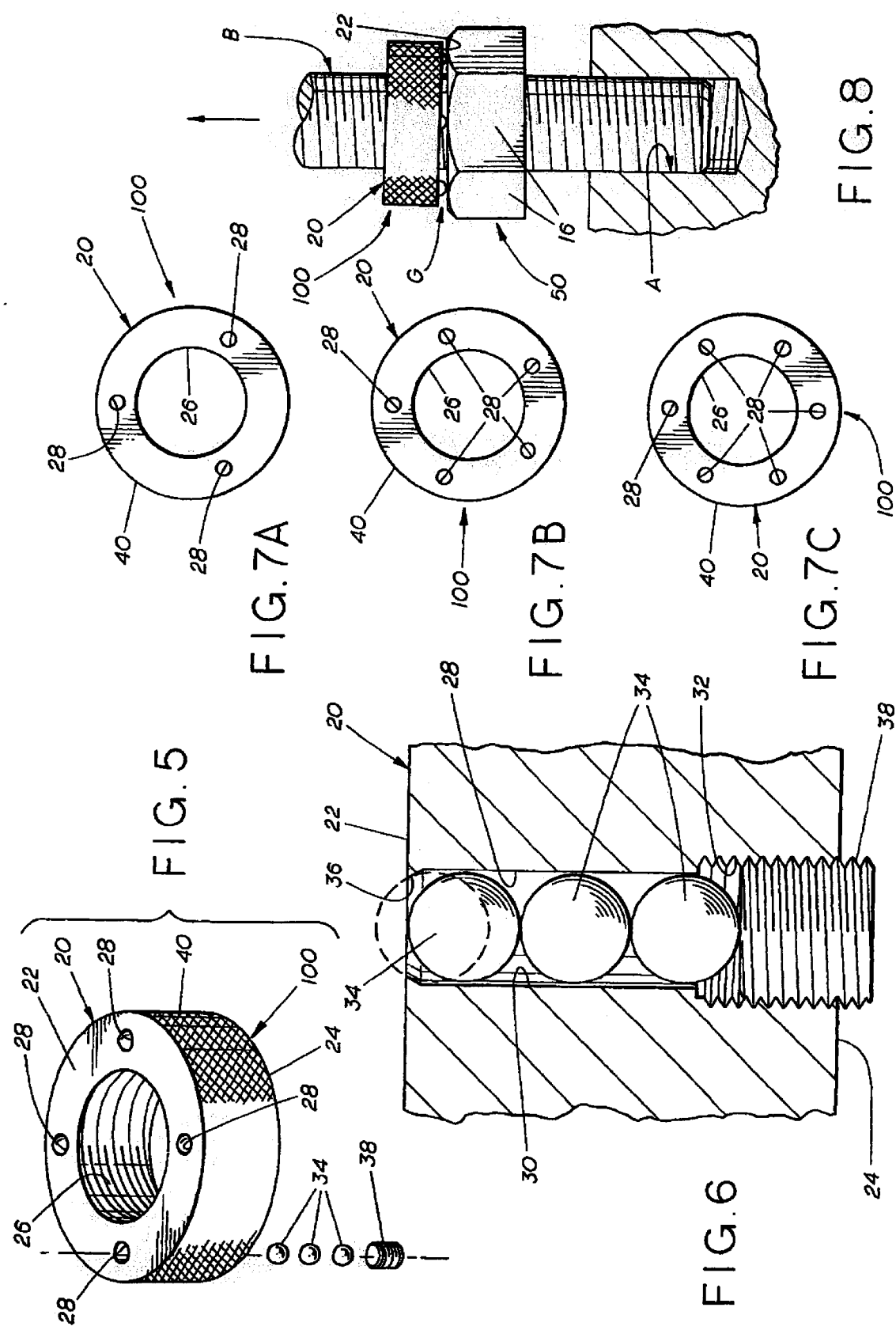

STUD BOLT TOOL AND METHOD OF USING SAME

BACKGROUND OF THE INVENTION

1. Field of the Invention

The present invention relates to a tool for use in installing or removing stud bolts.

2. Description of the Prior Art

Threaded stud bolts are used in a variety of applications. Typically, the stud bolts, designated generally as B, are installed in an internally threaded counter bore or blind bore A as shown in FIGS. 1 and 2. The stud bolts B are threaded along their entire length and have no surfaces for utilizing a wrench to rotate the stud bolt B and thereby threadably engage the stud bolt B with the threaded blind bore A.

FIGS. 1 and 2 disclose two known methods for screwing a stud bolt B into the threaded blind bore A. FIG. 1 illustrates one method in which a box nut 10 is screwed on top of the stud bolt B and a torque wrench (not shown) engages the box nut 10 to rotate it together with the stud bolt B. In FIG. 2, two nuts 12 and 14 are screwed onto the stud bolt B and the nut 14 is rotated so as to tighten the nut 14 against the nut 12 which interlocks the two nuts 12, 14. The nut 14 is then rotated with a torque wrench which also rotates the stud bolt B. In either of the methods shown in FIGS. 1 and 2, it is necessary to apply a force substantially equal to the force required to tighten the box nut 10 to the stud bolt B or the nuts 12, 14 to the stud bolt B in order to loosen and remove the nuts. Removing the cap nut 10 requires use of a torque wrench to loosen the cap nut 10 from the end of the stud bolt B without loosening the stud bolt B from the blind bore A. The stud bolt B cannot be gripped by the threads for fear of damaging the threads. In FIG. 2, the flat side surfaces 16 of the two nuts 12, 14 must be aligned at high torque to enable use of an impact wrench and socket. If an impact wrench and socket is used to loosen the nut 14, the operator's safety will be jeopardized. Thus, this second method typically requires a two tool operation in which the lower nut 12 is held with a wrench while the upper nut 14 is reversibly rotated to free the interlocked nuts. Oftentimes, it is extremely difficult to free the interlocked nuts 12, 14 and it is required to be performed in dangerous environments, as for example, from catwalks, scaffolding, etc. In such circumstances, the sudden breaking loose of one nut under high torque could throw the operator off balance causing the operator to fall from scaffolding, etc.

The second method of using two nuts 12, 14 may also be used to remove the stud bolt B. In the removal operation, a torque wrench is applied to the lower nut 12 and torque is applied in the appropriate direction. Typically, the flat surfaces 16 of the nuts 12 and 14 are not aligned with the nuts are interlocked. Thus, since this is generally the case, in impact wrench with socket cannot be used to rotate the lower nut 12 when removing the stud bolt B. Once the stud bolt B has been removed, a two tool operation is again required to remove the interlocked nuts 12, 14. The stud bolt B is not anchored at this point and removing the nuts 12, 14 is a dangerous operation. One alternative is to take the removed stud bolt B with the interlocked nuts 12, 14 to the machine shop and place one nut in a vise to hold that nut stationary while the second nut may be reversibly rotated with a wrench. However, oftentimes a vise is not available in the field to break loose or free the interlocked nuts 12, 14.

U.S. Pat. No. 4,977,799 discloses a clamping tool for use with a stud bolt. The clamping tool includes a torque transmission mechanism such that the torque necessary to loosen the clamping tool to detach it from the stud bolt tightened in position is much smaller than the torque necessary to tighten the stud bolt. This clamping tool is a complex tool which is expensive to fabricate and which cannot be used to remove a tightened stud bolt from a blind bore.

It is highly desirable to have a tool for stud bolt removal and installation operations which is of simple construction, low cost manufacture, and which is readily mountable to the stud bolt for operation or dismountable from the stud bolt after operation by a single operator in the field with safety.

SUMMARY OF THE PRESENT INVENTION

The present invention is a tool for stud bolt removal and installation operations which is simple to use, convenient, easy to manufacture, and extremely safe to use.

The stud bolt tool has a cylindrical body or housing having a first and second surface and an internally threaded bore communicating with the first and second surfaces. A plurality of circumferentially spaced ports surround the internally threaded bore in the housing. The ports communicate with the first and second surfaces of the housing. Each of the ports has a threaded portion which extends towards the second surface. A plurality of ball bearings are slidably stacked in each port. The ball bearing nearest the first surface is capable of partially protruding beyond the first surface to bear against a nut positioned on the stud bolt and is also capable of retracting within the port below the first surface. A screw threadably engages the threaded portion of the port. As the screw is advanced into the port, it forces the opposite ball bearing to partially protrude beyond the first surface. When the screw is partially unthreaded from the port, the ball bearing is allowed to fully retract within the port below the first surface.

In use, the stud bolt tool and a nut are threaded onto a stud bolt. The first surface of the stud bolt tool is brought into contact with the nut. The screws have been positioned such that the ball bearings are not forced to protrude beyond the first surface of the tool body but are fully retractable within the port. With the first surface of the stud bolt tool contacting the nut on the stud bolt, the screws are threadably advanced in each of the ports to force the ball bearing to partially protrude beyond the first surface until it is in firm engagement with the nut. A torque wrench is applied to the nut and torque is applied in the direction to rotate the nut towards the stud bolt tool which is now interlocked with the nut. As the nut rotates, the stud bolt tool and the stud bolt also rotates. After the stud bolt has been positioned as desired (installed or removed) the screws of the stud bolt tool are threadably reversed in each of the ports to allow the ball bearing to retract therein to disengage them from contact with the nut, and the stud bolt tool and nut may readily be removed from the stud bolt by hand torquing.

BRIEF DESCRIPTION OF THE DRAWINGS

In order to more fully understand the drawings referred to in the detailed description of the present invention, a brief description of each drawing is presented, in which:

FIG. 1 is an elevation view of partial cross-section of a stud bolt partially installed in a blind bore with a closed end box nut;

FIG. 2 is an elevation view in partial cross-section of a stud bolt partially installed in a blind bore with interlocking double nuts;

FIG. 3 is an elevation view in partial cross-section of a stud bolt being installed in a bore with a nut and the stud bolt tool of the present invention;

FIG. 4 is a view taken along line 4—4 of FIG. 3;

FIG. 5 is an exploded view of the stud bolt tool;

FIG. 6 is a cross-sectional view taken along line 6—6 of FIG. 4;

FIG. 7A, 7B, and 7C are top views of alternate embodiments of the stud bolt tool having varying numbers of circumferentially spaced ports for locking the stud bolt tool; and FIG. 8 is an elevation view in partial cross-section of a stud bolt being removed from a blind bore with a nut and the stud bolt tool of the present invention.

DETAILED DESCRIPTION OF THE INVENTION

Referring now to FIG. 2, it can be seen that when the two nuts 12 and 14 are tightened against one another on the stud bolt B, a small gap, designated generally as G, exists between a portion of the opposing surfaces 13 and 15 of the nuts 12 and 14, respectively. Because of the stud bolt threads, the top and bottom surfaces of a nut are not perfectly square to the axis of the stud bolt B. However, when the nuts 12, 14 are interlocked on the stud bolt B, commonly referred to as "double-nutted," the interlocked nuts contact and frictionally engage one another and the nuts' threads and the stud bolt threads are frictionally engaged which results in frictionally locking the two nuts against rotation relative to the stud bolt.

Referring to FIG. 5, the stud bolt tool, designated generally as 100, is shown in exploded view. The tool 100 includes a tool housing or body 20 having a substantially planar second surface 22 and a substantially planar second surface 24 in opposing relationship to the first surface 22. The tool body 20 includes an internally threaded through bore 26 communicating with the first and second body surfaces 22 and 24 respectively. The diameter and threading of the internally threaded bore 26 corresponds with the diameter of the threaded stud bolt B onto which it will be screwed. The tool body 20 further includes a plurality of ports 28 which are circumferentially spaced around the internally threaded bore 26. The ports 28 communicate with the first and second surfaces 22, 24, respectively, of the tool body 20. As shown in FIGS. 3 and 6, the ports 28 includes a first portion 30 having a smooth, cylindrical bore and a second portion 32 which includes a threaded cylindrical bore. In the preferred embodiment, a plurality of ball bearings 34 sized to fit in the port 28 are assembled in the port 28. As shown in FIGS. 3, 5 and 6, three ball bearings 34 are stacked in each port 28, although it is possible to use more or fewer ball bearings 34 in each port 28. Preferably, each port 28 contains two or three ball bearings 34. However, even a single ball bearing 34 may be used.

The diameter of the ball bearings 34 are sized approximately to the diameter of the first portion 30 of the port 28. This ensures that the stack of ball bearings 34 remain in a linear relationship while in the port 28. It is, however, important that the ball bearings 34 are free to slide longitudinally within the port 28. Preferably, the diameter of the first portion 30 of the port 28 is approximately 0.002" to 0.003" greater than the diameter of the ball bearing 34.

As shown in FIG. 6, a lip or stopping means 36 is provided at the interface of the port 28 with the first surface 22 of the tool body 20. The stopping means 36 prevents the ball bearings 34 from exiting the port 28 at the first surface 22. The stopping means 36 may consist of any of several known ways of restricting the travel of a ball bearing in a cylindrical port. By way of example, the lip or stopping means 36 could be a reduced diameter bore at the interface with the first surface 22 and could be formed by punching or deforming the circumference of the port 28 at the first surface 22.

Referring to FIGS. 5 and 6, a screw 38 is threaded into the second portion 32 of each port 28. The screw 38 is preferably an allen screw having a countersunk hexagonal head for which an allen wrench (not shown) is used to rotate the allen screw 38. Other types of set screws may be used, but it has been found preferable to use an allen screw due to the space limitations and ease of manipulating the allen screws with an allen wrench.

As shown in FIG. 5, there are four ports 28 circumferentially spaced around the threaded bore 26. Preferably, at a minimum there should be at least three ports 28 circumferentially spaced around the internal threaded bore 26 as shown in FIG. 7A. However, it may be desirable to have five, or even six ports 28 spaced around the bore 26 as shown in FIGS. 7B and 7C, respectively. The number of bores 28 desired may vary depending on the diameter of the internal threaded bore 26.

In the preferred embodiment, the tool body 20 has a cylindrical outer surface 40 as shown in FIGS. 4, 5, 7A, 7B, and 7C. Preferably, the outer diameter D1 of the tool body 20 is less than the distance D between opposing flat side surfaces 16 of a nut 50, as shown in FIG. 4, for reasons which will be explained below. It is to be understood that the nut 50 is a standard hexagonal nut. The outer surface 40 may be knurled (See FIGS. 3, 5, and 8) to provide a good gripping surface for handling the tool 100.

It should be further understood that a separate stud bolt tool 100 is required for each diameter of stud bolt B. Additionally, it is necessary that the threads of the internally threaded bore 26 correspond with the threads of the stud bolt B.

The operation of using the stud bolt tool 100 of the present invention will now be described. Firstly, referring to FIG. 3, the operation of installing a stud bolt B with the tool 100 will be described in detail. The screws 38 are threadably adjusted in the ports 28 so that the ball bearing 34 nearest the first surface 22 and farthest from the screw 38 is positioned at or slightly below the plane of the first surface 22, as shown by solid lines in FIG. 6. The tool 100 is threaded onto the stud bolt B with the threads of the stud bolt B mating the internally threaded bore 26 of the tool body 20. It is important that the tool 100 is threaded onto the stud bolt B in a manner such that the first surface 22 of the tool body 20 faces the regular nut 50 which is next threaded onto the end of the stud bolt B, as shown in FIG. 3. The tool 100 is threaded onto the stud bolt B a distance sufficient to permit the regular nut 50 to also be threaded onto the end of the stud bolt B.

The nut 50 is threaded by hand onto the stud bolt B until the nut 50 contacts the first surface 22 of the tool 100. The operator takes the allen wrench and screws the allen screws 38 further into the threaded portion 32 of the ports 28 until all the stacks of ball bearings 34 make firm contact with the nut 50, thus interlocking the tool 100 with the nut 50, as shown in FIG. 3. The engagement of the ball bearings 34 against the nut 50 causes the threads of the tool 100 and the nut 50 to frictionally engage the threads of the stud bolt B. The circumferential spacing of the ports 28 permits frictional engagement of the threads uniformly around the periphery of the stud bolt B. Thus, for larger diameter stud bolts such as 1½" to 2" stud bolts, it may be desirable to include more ports 28, as shown in FIGS. 7B and 7C, to ensure uniform frictional engagement with the stud bolt B. This is more important in the removal operation of a stud bolt B due to the higher forces required to free a stud bolt B from the bore A. The individual allen screws 38 in each port 28 allows independent engagement of each stack of ball bearings 34 with the nut 50 irrespective of the gap G existing between the first surface 22 of the tool 100 and the nut 50.

It should be understood that the amount of the gap G that can be taken up by the ball bearings 34 is limited to less than ½ the diameter of the ball bearing 34 due to the stopping means 36 preventing the dislocation of the ball bearing 34 from the port 28. The gap G that exists when the tool 100 and the nut 50 are brought into contact will vary depending on the size of the stud bolt B. The larger the stud bolt B, the larger the gap G that may exist. Thus, larger diameter ball bearings 34 will be required in the stud bolt tools 100 for the larger stud bolts. However, for the stud bolt tools 100 for the smaller diameter stud bolts B (for example, ½" to 1"), smaller ball bearings 34 are required due to the space limitations imposed by distance D between the flat surfaces 16 of the nut 50 and the need to keep the outside diameter D1 of the tool 100 less than the distance D. Thus, it has been found that ball bearings 34 having a diameter of ⅛" to 5/32" are suitable in stud bolt tools 100 in the range of ½" to 1¼" diameter stud bolts, whereas a 7/32" diameter ball bearing may be required to accommodate 1½" to 2" diameter stud bolts.

The stud bolt B with the tool 100 and the nut 50 is now loosely threaded by hand into the blind bore A. A torque wrench (not shown) is applied to the nut 50 and the stud bolt B is tightened in the blind bore A. As can be seen in FIGS. 3 and 4, a socket (not shown) can be positioned over the nut 50 and extend over the stud bolt tool 100 without any interference by the stud bolt tool 100 due to its reduced diameter D1. Once the stud bolt B has been tightened, the operator removes the torque wrench and partially unthreads the allen screws 38 from the port 28 with the allen wrench so that the ball bearings 34 are once again slidably retractable in their initial position in the ports 28 and no longer in firm engagement with the nut 50. The tool 100 and the nut 50 are no longer interlocked and the nut 50 and the tool 100 are removed with ease and may even be removed by hand.

Referring to FIG. 8, the operation of removing a stud bolt B with the tool 100 will now be described in detail. The nut 50 is installed on the stud bolt B. The stud bolt tool 100 is threaded onto the stud bolt B with the ball bearings 34 facing the nut 50. The allen screws 38 are in their initial position such that the allen screws 38 are not forcing the ball bearings 34 beyond the first surface 22 of the tool body 20. The tool body 20 is threaded onto the stud bolt B until the first surface 22 contacts the nut 50. The operator then takes the allen wrench and screws the allen screws 38 further into the threaded portion 32 of the ports 28 until all the stacks of ball bearings 34 make firm contact with the nut 50, thus interlocking the tool 100 with the nut 50, as shown in FIG. 8.

A torque wrench (not shown), such as an impact wrench and socket, is applied to the nut 50. Due to the outer diameter D1 of the stud bolt tool 100 being less than the distance between the flat surfaces 16 of the nut 50, the socket can be positioned over the stud bolt tool 100 and then over the nut 50. The operator then applies a torquing force to the nut 50 to unthread the stud bolt B from the blind bore A. Once the stud bolt B has been removed from the blind bore A, the operator removes the torque wrench and partially unthreads the allen screws 38 from the port 28 with the allen wrench so that the ball bearings 34 are no longer in firm engagement with the nut 50. The stud bolt tool 100 and the nut 50 are no longer interlocked and the nut 50 and the stud bolt tool 100 are removed with ease from the stud bolt B.

In an alternative embodiment of the invention the means for interlocking the stud bolt tool 100 to a nut 50 may comprise a screw only wherein the screw is of a length greater than that of port 28, and the tip of the screw preferably has a tapering point in the nature of a ball point. In this embodiment that ball point screw comprises a single element which forms the means for protruding beyond or retracting within the housing 20 of the tool 100 for interlocking or releasing from interlocking with a nut 50 for stud bolt B installation or removal from a blind bore A.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An article of manufacture, comprising:
   a cylindrical housing having a first and second surface and an internally threaded bore communicating with said first and second housing surfaces, said housing including a plurality of circumferentially spaced ports surrounding and spaced from said internally threaded bore, said ports communicating with said first and second housing surfaces, each said port has a threaded portion extending towards said second housing surface;
   a plurality of balls slidably stacked in each said port, each said ball nearest said first housing surface capable of partially protruding beyond said first housing surface; and
   means for engaging said stack of balls in each of said ports.

2. An article of manufacture, comprising:
   a cylindrical housing having a first and second surface and an internally threaded bore communicating with said first and second housing surfaces, said housing including a plurality of circumferentially spaced ports surrounding said internally threaded bore, said ports communicating with said first and second housing surfaces, each said port has a threaded portion extending towards said second housing surface;
   a plurality of balls slidably stacked in each said port, each said ball nearest said first housing surface capable of partially protruding beyond said first housing surface; and
   means for engaging said stack of balls in each of said ports, said means for engaging includes a screw threadably engaging said threaded portion of said port, one said screw is threaded into each said port and advancement of said screw into said respective port forces said ball nearest said first housing surface to partially protrude beyond said first housing surface.

3. The article of claim 2, wherein each said port has an opening at said first housing surface smaller than the diameter of said ball stacked nearest said first housing surface.

4. The article of claim 1, wherein said housing has an exterior diameter less than a width across the flats of a standard hexagonal nut having the same internal diameter as the internal diameter of said threaded bore.

5. An article of manufacture, comprising:
   a housing having a first and second surface and an internally threaded bore communicating with said first and second housing surfaces, said housing including a plurality of circumferentially spaced ports surrounding and spaced from said internally threaded bore, said ports communicating with said first and second housing surfaces; and means engaged in said ports for protruding beyond said first housing surface, said means for protruding are independently engaged in each of said ports, wherein each said port has a threaded portion extending towards said second housing surface and said means for protruding comprises a ball slidably positioned in each said port.

6. The article of claim 4, wherein said housing has a cylindrical exterior surface having a diameter less than a width across the flats of a standard hexagonal nut having the same internal diameter as the internal diameter of said threaded bore.

7. The article of claim 5, wherein said means for protruding includes a screw threadably engaging said threaded portion of said port, one said screw is threaded into each said port and advancement of said screw into said respective port forces said ball to partially protrude beyond said first housing surface and prevents said ball from moving towards said second housing surface.

8. The article of claim 5, wherein each said port has an opening at one housing surface smaller than the diameter of said ball.

9. An article of manufacture, comprising:

a housing having a first and second surface and an internally threaded bore communicating with said first and second housing surfaces, said housing including a plurality of circumferentially spaced ports surrounding and spaced from said internally threaded bore, said ports communicating with said first and second housing surfaces; and means engaged in said ports for protruding beyond said first housing surface, wherein said means for protruding comprises a plurality of balls in each of said ports.

10. The article of claim 9, wherein said means for protruding are independently engaged in each of said ports.

11. The article of claim 8, wherein said plurality of circumferentially spaced ports includes at least three circumferentially spaced ports.

* * * * *